(12) United States Patent
Trossen

(10) Patent No.: US 7,274,943 B2
(45) Date of Patent: Sep. 25, 2007

(54) SERVICE SUBSCRIPTION IN A COMMUNICATION SYSTEM

(75) Inventor: Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 219 days.

(21) Appl. No.: 10/638,552

(22) Filed: Aug. 12, 2003

(65) Prior Publication Data

US 2004/0151192 A1   Aug. 5, 2004

Related U.S. Application Data

(60) Provisional application No. 60/443,843, filed on Jan. 31, 2003.

(51) Int. Cl.
*H04Q 7/20* (2006.01)
(52) U.S. Cl. .................. 455/461; 455/445; 455/435.1; 370/349
(58) Field of Classification Search ............... 455/461, 455/445, 435.1, 410; 709/237, 206; 370/349, 370/401
See application file for complete search history.

(56) References Cited

U.S. PATENT DOCUMENTS

| 2003/0035409 | A1* | 2/2003 | Wang et al. ............... 370/349 |
| 2003/0217174 | A1* | 11/2003 | Dorenbosch et al. ....... 709/237 |
| 2004/0003046 | A1* | 1/2004 | Grabelsky et al. ......... 709/206 |
| 2004/0038689 | A1* | 2/2004 | Holur ........................ 455/461 |

FOREIGN PATENT DOCUMENTS

| EP | 1 043 906 A2 | 10/2000 |
| WO | WO 00/42760 | 7/2000 |
| WO | WO 02/05534 A1 | 1/2002 |
| WO | WO 02/067597 A2 | 8/2002 |

OTHER PUBLICATIONS www.hotsip.com; "Hotsip® Presence & Messaging Gateway" 2 pages.
www.ietf.org/rfc/rfc3261.txt; SIP: Session Initiation Protocol; 252 pages.
www.ietf.org/rfc/rfc3265.txt; Session Initiation Protocol (SIP)-Specific Event Notification; 36 pages.
www.hotsip.com; "Hotsip® Presence & Messaging Gateway" 2 pages, no date.
www.ief.org/rfc/rfc3261.txt; SIP: Session Initiation Protocol; 252 pages, no date.
www.ietf.org/rfc/rfc3265.txt; Session Initiation Protocol (SIP)-Specific Event Notification; 36 pages, no date.

* cited by examiner

*Primary Examiner*—Jean Gelin
*Assistant Examiner*—Phuoc Doan
(74) *Attorney, Agent, or Firm*—Squire, Sanders, & Dempsey, LLP

(57) ABSTRACT

A communication system includes a first communication network, a second communication network, a gateway entity, a subscriber entity, and at least one service provider entity. The first communication network services a mobile user equipment in accordance with a first communication protocol. The mobile user equipment is configured to generate a service request containing information regarding a desired service. The second communication network operates in accordance with a second communication protocol. The gateway entity interfaces the first and second communication networks. The subscriber entity connects to the second communication network for generating a service subscription message in accordance with the second communication protocol based on information from the service request. The at least one service provider entity provisions the requested service in response to the service subscription message generated by the subscriber entity.

39 Claims, 5 Drawing Sheets

SERVICE SUBSCRIPTION IN A COMMUNICATION SYSTEM

CROSS-REFERENCE TO RELATED APPLICATIONS

This application claims priority of U.S. Provisional Patent Application Ser. No. 60/443,843 entitled "Service Subscriptions in a Communication System," filed on Jan. 31, 2003 the entire contents of which are incorporated herein by reference.

BACKGROUND OF THE INVENTION

1. Field of the Invention

The present invention relates service provisioning by means of a communication system, and more particularly to provisioning of services in arrangements wherein the user needs to subscribe to services.

2. Description of the Related Art

A communication system is a facility that enables communication between two or more entities such as user terminal equipment and/or networks entities and other nodes associated with the communication system. The communication may comprise, for example, communication of voice, electronic mail (email), text messages, data, multimedia and so on.

The communication may be provided via fixed line and/or wireless communication interfaces. A feature of the wireless communication systems is that they provide mobility for the users thereof. An example of communication systems providing wireless communication is a public land mobile network (PLMN). An example of the fixed line systems is a public switched telephone network (PSTN).

A communication system typically operates in accordance with a given standard or specification which sets out what the various elements of the system are permitted to do and how that should be achieved. For example, the standard or specification may define if the user, or more precisely, user equipment is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable the user equipment to communicate via the communication system.

Each communication system operates by running various different functions. The functions of various communication systems have been developed quite independently from each other. Thus it is possible that two communication systems such as two different communication networks handle a function in a different manner. For example, different and non-compatible protocols may be used for service provisioning in different communication systems.

For example, in communication environments such as those based on protocols such as the Internet Protocol (IP) or the Session Initiation Protocol (SIP) or the current third generation (3G) communication network architectures it is assumed that various servers are used for handling the provisioning of different communication services for users. In such communication systems the communication connections may not be based on a "circuit" between the communicating nodes, but the messages may rather be transported as packets that are provided with destination address information. Hence the name packet switched systems. The server entities and the user equipment may communicate with each other based on appropriate protocols providing such a connectionless operation.

From the above the Session Initiation Protocol (SIP) is an application-layer control protocol for creating, modifying and terminating sessions with one or more participants. A user connected to a SIP based communication system may communicate with various entities of the communication system based on standardised SIP messages. Examples of the possible sessions include Internet multimedia conferences, Internet telephone calls, and multimedia distribution. Those interested will find a more detailed description of the SIP from an Internet Engineering Task Force (IETF) protocol specification by J. Rosenberg et al titled "SIP: Session Initiation Protocol", RFC 3261, July 2002. This document is incorporated herein by reference.

An Internet Engineering Task Force (IETF) protocol specification by A. Roach titled "SIP—Specific Event Notification", RFC 3265, July 2002 describes a SIP event framework providing means to establish an IP-based event delivery mechanism. This document is also incorporated herein by reference.

Many scenarios are likely to be realized based on the SIP event notification framework. For instance, presence subscriptions and notifications allow for subscribing to a presence service wherein the subscriber is notified about changes in the presence status of e.g., a friend or other target user. Other scenarios include registrations for services and content available via the IP based Internet, changes in access rights for certain resources and so on. It is also possible to offer services such as reports regarding changes in the home through SIP event messaging services wherein homeowners can be notified through SIP event notifications upon predefined changes in the status of their homes.

The SIP event framework does not have any provisions for non-SIP-enabled user equipment. Thus the SIP event framework assumes that the services are always used by means of IP-enabled user equipment and even more importantly a SIP-enabled user equipment. However, the current mobile user equipment such as second generation mobile phones does not provide capabilities for SIP. Thus a large number of mobile user equipment could not be able to use services that are offered based on the SIP.

There have been proposals for delivering SIP notifications to user equipment by means of messages that are based on some other protocols. For example, Short Message Service (SMS) of the second generation the GSM mobile phone system can be used to transfer text messages to mobile phones today, and is widely used and supported in the GSM networks.

Products have already been offered for enabling use of the SIP based services by means of user equipment that is not SIP enabled. For example, Hotsip AB, Sweden, offers a presence and messaging gateway that offers a notification engine which includes a gateway from the SIP communication environment to the SMS environment. The arrangement proposed by Hotsip AB is disclosed in more detail in international patent application publication No. WO 02/05534. Dynamicsoft, Inc, USA, offers another gateway that is capable of translation wireless application protocol (WAP) and SMS content into SIP based messages that can then be delivered to an SIP-enabled device. The SIP enabled device can be a mobile or a fixed device.

However, these solutions are fixed to the particular SIP applications and in reality work only one-way. That is, the proposed gateways are merely for delivering notifications from e.g., a SIP presence server to the GSM user equipment by means of predefined standard messages. Furthermore, because the messages can only be selected among a list of predefined messages, the notifications are application specific, i.e., specific for particular SIP services such as presence service. The proposed gateways are based on closed concept i.e. need to be run and managed by the operator of the user's telecommunication network. Therefore any external service providers are excluded from offering SIP based services for non SIP enabled users. There is no teaching in the prior art how the gateway arrangement could be used for a variety of SIP services. Furthermore, the proposed gateways do not allow the user to subscribe to any of the SIP services. Instead, the subscriptions to the given services are not based on the SIP event framework but use the existing GSM framework, e.g., a call to a specific telephone number.

Thus, there is a need for a more flexible solution for enabling subscription and use of services provided by a service provided entity connected to a network operating accordance with a communication protocol by means of a user equipment that is not adapted for communication in accordance with the communication protocol.

SUMMARY OF THE INVENTION

Embodiments of the present invention aim to address one or several of the above problems.

According to one aspect of the present invention, there is provided a method of providing services for a user of a mobile user equipment, the method comprising:

sending a service request from the user equipment to a gateway entity in accordance with a first communication protocol, the service request containing information regarding a service the user wishes to subscribe to;

delivering from the gateway entity to a subscriber entity the information regarding the requested service;

generating at the subscriber entity a service subscription message based on the information regarding the requested service and in accordance with a second communication protocol;

sending the service subscription message from the subscriber entity to a service provider entity providing the requested service; and sending data to the user equipment for the provisioning of the requested service.

According to another aspect of the present invention there is provided a communication system comprising:

a first communication network servicing a user equipment in accordance with a first communication protocol, the mobile user equipment being configured to generate a service request containing information regarding a desired service;

a second communication network operating in accordance with a second communication protocol;

a gateway entity interfacing the first and second communication networks;

a subscriber entity connected to the second network for generating a service subscription message in accordance with the second communication protocol based on information from the service request; and at least one service provider entity for the provision of the requested service in response to the service subscription message generated by the subscriber entity.

According to another aspect of the present invention there is provided a service subscriber entity for provision of services for a user of a mobile user equipment via a communication system, the service subscriber entity comprising a processor for processing service requests received from the user equipment via a gateway entity based on messages generated in accordance with a first communication protocol, the processing being for obtaining information regarding services the user desires to subscribe to and for generating service subscription messages in accordance with a second communication protocol based on the information regarding the requested services, and the service subscriber entity being configured to send the service subscription messages to a service provider entity.

According to another aspect of the present invention, the user equipment communicates via a first communication system and the service provider entity and the subscriber entity communicate via a second communication system, and the gateway entity interfaces the first and second communication systems.

In a more specific form the first communication protocol enables the user equipment to send and receive short text messages.

The second communication protocol may comprise session initiation protocol. The service provider entity may provide a session initiation protocol event server. The message generated by the subscriber entity may comprise a message for subscribing to an event provided by the service provider entity in accordance with the session initiation event protocol. The subscriber entity may generate the subscription message to include information regarding at least one of: the requested event package, the requested event, and event specific information.

One of more messages may be sent in response to the service subscription message from the service provider entity, the messages containing information associated with the provisioning of the service to the subscriber entity in accordance with the second communication protocol. A message may then be generated in response to a message from the service provider entity at the subscriber entity for transportation to the user equipment in accordance with the first communication protocol.

The service request may contain information regarding the user equipment, the service provider entity, the requested service, and the subscriber entity.

Information regarding the service request received from the user equipment may be stored at the subscriber entity.

The service subscriber entity may be managed independently from the operator of the communication system servicing the user equipment.

A service subscriber relationship may be established between the user equipment and the service provider entity before sending the service request from the user equipment to the subscriber entity.

The embodiments of the invention may enable a flexible solution for delivering SIP event subscriptions and notifications from and to mobile user equipment that are not SIP-enabled. The embodiments may enable integration of non-SIP enabled user equipment into SIP event environments, such as home environments, SIP-based news subscriptions, various notifications and content provision schemes and so on. Hence, the embodiment may extend the scope of the SIP-based subscription/notification scenarios. No changes are necessary to the SIP itself or the user equipment. Furthermore, the embodiments may allow for using any kind of SIP events through introduction of the proxy notion for a SIP event subscriber. Hence, the embodiments can be made transparent to the SIP entities such as the SIP event server, and no changes are necessary to the existing SIP entities. In this regard a reference can be made to the prior art SIP event servers which need to be integrated with the SMS gateway functionality or handled individually, which would put the burden on each SIP event server. The embodiments may provide distributed system architecture. Such an architecture may enable, for example, arrangements wherein the messaging gateway is owned and managed by the operator of the telecommunication network and the network entity subscribing on behalf of the user is owned and managed by an independent service provider. Furthermore, new providers of SIP based services may only need to introduce the services to the subscribing entities on the SIP side, and not to all possible users.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
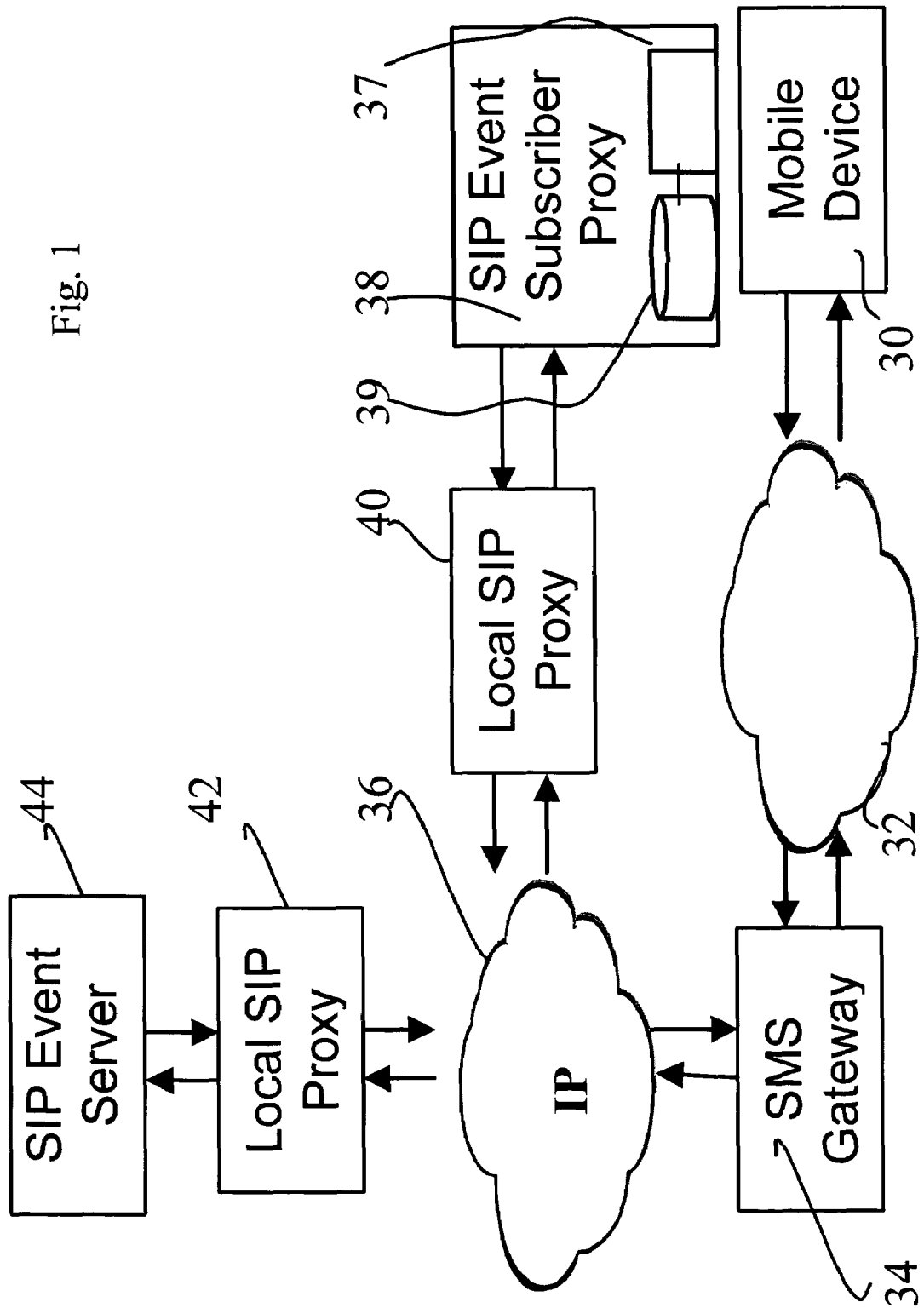
FIG. 1 shows one embodiment of the present invention.

FIG. 1 shows schematically a communication system wherein a mobile user equipment 30 may communicate with a service provider entity 44 via two different communication networks 32 and 36. The first network comprises a mobile communication network 32 offering mobile telecommunication services for mobile subscribers. The second network comprises a packet switched network 36 that operates in accordance with the Internet Protocol (IP).

More particularly, the mobile communication network 32 is adapted to provide wireless communication services for the mobile user equipment 30. Typically this would happen via base stations of the mobile communication network. Such base stations, however, are not shown for clarity. The skilled person is familiar with the required apparatus for implementing a mobile communication network. The mobile communication network 32 may comprise various network elements such as radio network controllers, mobile switching centres, other switches and/or exchanges, and so on. One or more gateway nodes may also be provided for connecting the one network to other networks. The other networks may be based on different standards. As the elements of a mobile communication network as such do not form an essential element of the present invention, the mobile network is not described or shown in any more detail herein. It is sufficient to note that a mobile communication system operates in accordance with a given standard or specification which sets out what the various elements of the system are permitted to do and how that should be achieved. For example, the standard or specification may define if the user, or more precisely, user equipment such as a mobile station is provided with a circuit switched service and/or a packet switched service. Communication protocols and/or parameters which shall be used for the connection may also be defined.

In other words, a specific set of "rules" on which the communication can be based on needs to be defined to enable communication by means of the system. In the following the embodiment of the present invention will be described with reference to the GSM standards.

The skilled person is also familiar with the features and operation of a typical mobile user equipment. Thus these do not need any detailed explanation. It is sufficient to note that the user may use the mobile user equipment 30 for tasks such as for making and receiving phone calls, for receiving and sending data from and to the network and for experiencing e.g., multimedia content presented by means of the display and/or the speaker and for interactive correspondence with another party. The user equipment may comprise an antenna element (not shown for clarity) for wirelessly receiving and transmitting signals from and to base stations of the mobile communication network 32. The mobile user equipment 30 may also be provided with a display for displaying images and other graphical information for the user of the mobile user equipment. Speaker means are also typically provided. The operation of the mobile user equipment may be controlled by means of an appropriate user interface such as control buttons, voice commands and so on. Furthermore, a mobile user equipment is provided with a processor entity and a memory means.

The second network 36 is a packet switched Internet Protocol (IP) Network. The internet protocol (IP) is a so called layer three protocol that underlies the application layer in a layered communication system function model. The Session Initiation Protocol (SIP) messages can be delivered via the IP network. The SIP is an application-layer control protocol for creating, modifying and terminating sessions with one or more participants. A user connected to a SIP based communication system may communicate with various entities of the communication system based on standardised SIP messages.

The service provider entity 44 comprises a SIP event server. The SIP event server 44 is preferably configured to implement SIP events in accordance with the SIP-specific event notification procedures as described by A. Roach in the above referenced specification "SIP: Specific Event Notification".

A feature of the user equipment 30 is that it is not SIP-enabled. Therefore, it is not possible for the user thereof to directly use services offered by the SIP event server 44.

In this embodiment communications between mobile user equipment 30 and the SIP event server entity 44 is enabled by means of a SIP event subscriber proxy 38. The SIP event subscriber proxy server 38 is arranged to subscribe to and receive notifications from the service provider entity 44 on behalf of the mobile client 30. The required processing of data is handled by the processor 37 of the FIG. 1 event subscriber proxy entity 38.

It shall be appreciated that although the term SIP Subscriber Proxy is used herein for the subscriber entity 38 in accordance with the principles of the present invention, according to the conventional "SIP thinking" the subscriber entity 38 forms a user agent (UA) towards the SIP based network. However, the term proxy is also believed to be appropriate in this context since the subscriber entity 38 is subscribing on behalf of the mobile user equipment 30. Logically the mobile user equipment 30 can be seen as the user agent, although such a definition would not be used in the SIP realm.

Communications between the proxy server 38 and the mobile user equipment 30 may happen via short message service (SMS) through an SMS gateway 34 interfacing the IP network 36 and mobile communication network 32. The SMS gateway 34 is an entity that transforms messages received from the IP network into SMS messages sent to particular mobile devices via the mobile communication network 32 and vice versa (i.e., from SMS to IP and back).

The following describes in more detail with reference to FIG. 1 an architecture for integrating the non-SIP-enabled mobile user equipment 30 into a SIP event environment 44 by means of an SMS gateway 34. More particularly, the following describe manner how the non-SIP enabled mobile user equipment 30 may subscribe to SIP events offered by a SIP event server 44 after brief description of other elements of FIG. 1.

Two SIP proxy server entities 40, 42 are also shown. These are provided for the SIP event subscriber proxy 38 and the SIP event server 44, respectively. Each of the proxy servers 40, 42 is responsible for handling of SIP messages, for example for appropriately forwarding them to the specified entity. Although this is not absolutely necessary, a different proxy server is preferably provided for the SIP event server 44 and the SIP event subscriber proxy 38.

Figure 2:
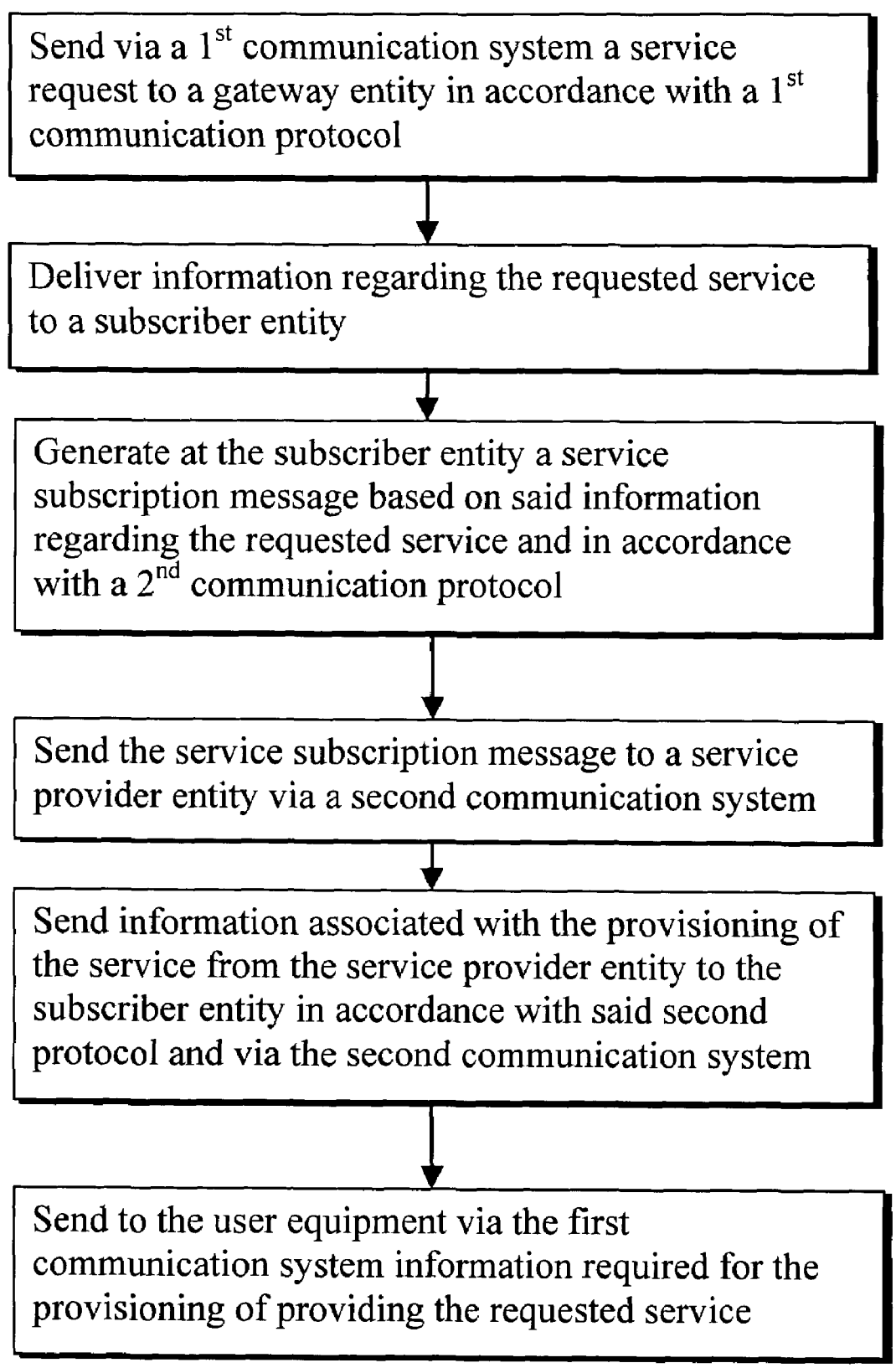
FIG. 2 is a flowchart in accordance with the principles of the present invention.
Figure 3:
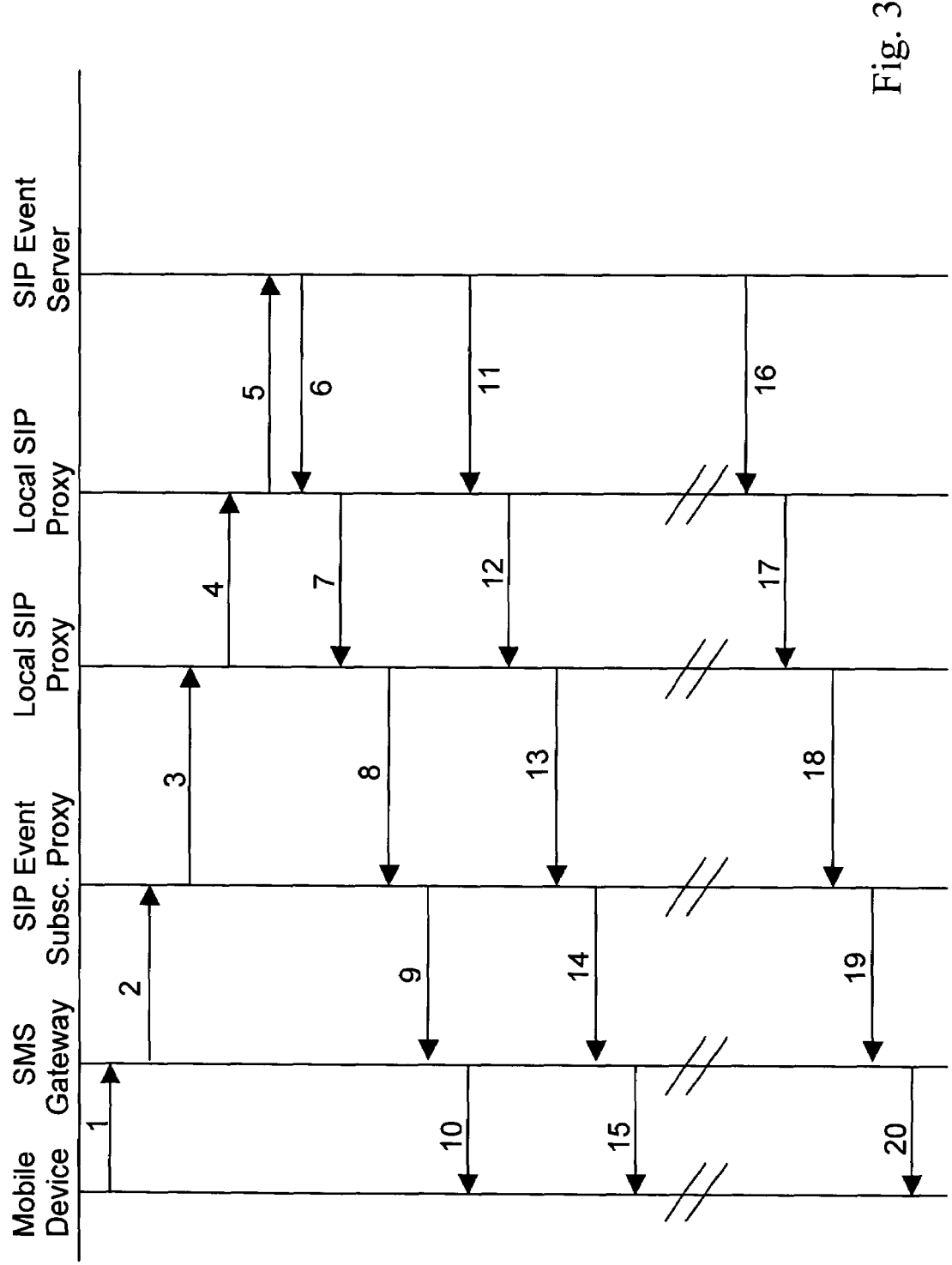
FIG. 3 is a signalling chart illustrating the operation of one embodiment of the present invention.

The referenced method steps are shown in the flowchart of FIG. 2. FIG. 3 shows a more specific example for signalling in accordance with a preferred embodiment of the present invention.

The user of the mobile user equipment 30 who wishes to subscribe to a particular SIP event may send an SMS message 1 to the SMS gateway 34 via the mobile communication network 32. Message 1 preferably contains information identifying the SIP event server which hosts the event and the SIP event subscriber proxy which will subscribe on behalf of the mobile user equipment to said event server. The information may be in the form of a unique identifier for each of the two server entities. The unique identifier may be any appropriate identifier, such as a Universal Resource Identifier (URI).

Message 1 also contains information regarding the event to be subscribed to. The event information is necessary for the purpose of subscribing to the event in accordance with the SIP event protocol. This information may be, for instance, the name of the event package, the actual event, or other event-specific information. The other information may be information such as the status of presence, accuracy of location, activity of a present entity.

Information required for the routing the subscription request can be obtained from the message 1. For example, information regarding the short message service centre (SMSC; not shown for clarity) of the mobile communication network, phone number, subscriber proxy ID and SIP event server ID may be included by the mobile user equipment into the message. For example, a conventional SMS message already contains information regarding the originating address i.e. the mobile user equipment address, address for the SMS centre, address (the so called E.164 address) of the SMS gateway or set of SMS gateways and message content. The message content may then include the SIP event Subscriber Proxy address. The proxy address in the SMS content may be e.g. SIP-URI (SIP Uniform Resource Identifier), for example, 'SIP:SubProxy1@ims.domain.net', or an alias name of the proxy which is then converted into standard SIP-URI format of the corresponding SIP event subscriber proxy in the SMS gateway.

The format of the content of the SMS message 1 may vary. However, as this is not an essential feature of the present invention, the various possibilities for the format are not described in more detail. It is sufficient to note that the format needs to be such that the SIP event subscriber proxy 38 may interpret the information in order to enable it to issue a SIP subscription message.

Upon reception of message 1, the SMS gateway 34 extracts the address of the specified SIP event subscriber proxy 38 and sends the content of message 1 to the SIP event subscriber proxy 38 as message 2. As above, any appropriate format may be used for this message, and therefore it will not be explained in any greater details.

It shall be appreciated that the manner how this message is actually delivered from the gateway 34 to the SIP event subscriber proxy 38 is not an essential part of the present invention. The delivery may occur, for example, through UDP (User Datagram Protocol) packets on a defined port.

Upon reception of message 2, the SIP event subscriber proxy 38 sends an appropriate SUBSCRIBE message in accordance with the SIP event protocol to the SIP event server 44. In FIG. 3 this is sent as message 3 that is then routed as messages 4 and 5 via the SIP proxies 40 and 42. The identity of said SIP event server 44 is specified in the content of message 2. The subscription information, such as information regarding the event package, event, and the event-specific information, can be fetched from the content of message 2 as message 2 contains the original event specification sent from the mobile user equipment 30.

The SIP event subscriber proxy 38 may store in a database 39 thereof appropriate information regarding the subscription. The processor 37 of the subscriber proxy may store and access information in the database 39. The information is preferably stored in an internal cache memory. The stored information may contain information such as the identifier of the SIP event server which hosts the event, the identifier of the mobile user equipment that requested the subscription, and SIP information that is required to uniquely map received notifications with the appropriate subscriptions. For the last mentioned, appropriate SIP information such as a call ID might be used. The user equipment identifier may be any appropriate identifier such as the international mobile equipment identifier (IMEI), the code of the subscriber identity module (SIM), the international mobile subscriber identity (IMSI), or the telephone number of the subscribing user equipment.

The SIP event subscriber proxy 38 may also store the event information that was given in the request i.e. message 2 in FIG. 3. From this information it is possible to determine later, if required, what the subscription was for.

Upon reception of message 5, the SIP event server 44 handles the subscription appropriately in accordance with the SIP event protocol. In accordance with the SIP event protocol the server 44 generates a confirmation message. This would be a SIP '200 OK' message in the positive subscription case. The confirmation is then sent back as message 6 to the SIP event subscriber proxy 38. The confirmation may be delivered as messages 7 and 8 through the SIP proxies 42 and 40.

The confirmation is then forwarded to the mobile user equipment 30 as message 9 in FIG. 3. Message 9 is delivered via the SMS gateway 34 wherefrom the confirmation is sent further as message 10 to the user equipment 30. The SIP event subscriber proxy 38 may use the internally cached information to relate the confirmation is received from the event server 44 with the mobile user equipment 30 that subscribed to it.

In case of a successful subscription the SIP event server generates a NOTIFY message 11 in accordance with the SIP event protocol. The NOTIFY message contains information regarding the current status of the event. Message 11 is sent to the SIP event subscriber proxy via the two proxies 42 and 40 as messages 12 and 13. Upon reception of message 13, the SIP event subscriber proxy 38 forwards the content of the NOTIFY message appropriately to the mobile user equipment 30 via the SMS gateway 34 as messages 14 and 15.

As above with the confirmation signalling, the SIP event subscriber proxy 38 may use the internally cached information from the database 39 thereof to relate the received NOTIFY message with the subscribing mobile user equipment 30.

The information sent to the mobile user equipment in message 15 may include the identifier of the SIP event server which hosts the event, the identifier of the SIP event subscriber proxy which subscribed on behalf of the mobile device, and event information. The event information may be, is for instance, the name of the event package, the actual event, and event-specific information, such as the status, value, or other information.

The format of the content of the SMS message 15 is not important for the operation in accordance with the present invention. Furthermore, the manner how message 14 is delivered to the SMS gateway can be based on any appropriate messaging protocol. For example, a delivery through UDP packets on a defined port is a possibility.

If the subscription was not a 'one-shot subscription', i.e., the subscription's expiration time was more than zero, the SIP event server may generate a subsequent NOTIFY message 16 upon changes in the event's status and sends it to the SIP event subscriber proxy. In FIG. 3 these are forwarded as messages 17 and 18. The messages may be sent in response to a status change and/or periodically, for example once an hour or once a day.

Upon reception of message 18, the SIP event subscriber proxy 38 forwards the content of the NOTIFY message appropriately to the mobile device via the SMS gateway in messages 19 and 20. The SIP event subscriber proxy 38 uses the internally cached information from database 39 to relate the received NOTIFY message with the mobile user equipment that subscribed to it. The information included in message 20 is similar to message 15.

Various types of service providers may offer the SIP event subscriber proxy. For example, the proxy may be provided by a content provider, a network provider, or a service provider. The service provider may thus offer the services directly with the incentive to extend the customer base and applicability of a particular application.

The SIP event subscriber proxy may be implemented by a service provider who offers a service for SIP event delivery to non-SIP enabled mobile user equipment. Such a service provider may be e.g., a service provider who is independent from the networks or an operator of the mobile communication network or the IP network. The service provisioning can be implemented by means of SIP event user application (UA) implementations. These may require extensions for the delivery to and from the SMS gateway 34, and for the internal cache of subscriptions that is required to relate notifications to the appropriate mobile user equipment. These extensions can be realized as an application layer solution.

The mobile user equipment 30, such as a GSM mobile station, does not necessarily need any modifications since normal SMS can be used. Since the format of the event subscriptions and notifications is only dependent on the SIP event subscriber proxy, the provider of this entity might choose a user-friendly format of the SMS content so that even 'normal users' can interpret the received and sent information.

If the content of the messages exceeds the maximum length of an SMS which at the present is 160 bytes, the messages may contain a sequence number or other means for enabling segmentation and reassembly of the messages. Such message splitting and combining solutions are known in the art and will thus not be explained in more detail.

Figure 4:
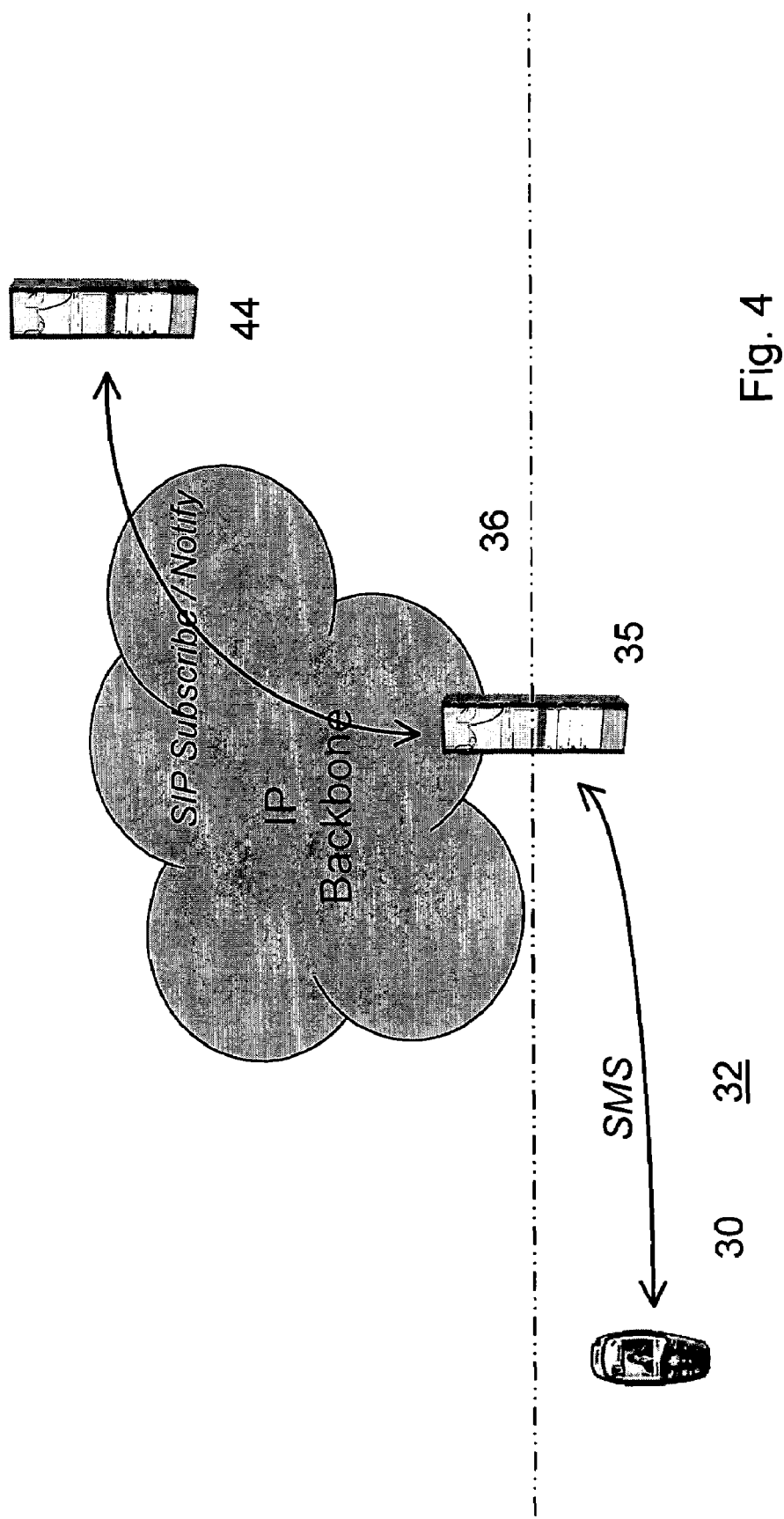
FIGS. 4 and 5 show further embodiments of the present invention.

FIG. 4 shows an embodiment wherein the SMS gateway 34 and SIP event subscriber proxy 38 are co-located in one network entity 35. This may be advantageous if, for example, these functions are provided through a service provider. However, a logical separation of both devices in the following is assumed. Differences in case of co-location of these entities will be described.

If the SMS gateway and SIP event subscriber proxy functionalities are located in a single network entity, then information regarding the identity of the event subscriber proxy entity as discussed with reference to message 1 of FIG. 3 may not be required. Furthermore, message 2 of FIG. 3 does not need to be sent at all over the IP network 36. Instead, the information can be delivered internally between the logical entities within the entity 35 provided with combined gateway and event subscriber proxy functions. The same applies to messages 9, 14 and 19 of FIG. 3.

Figure 5:
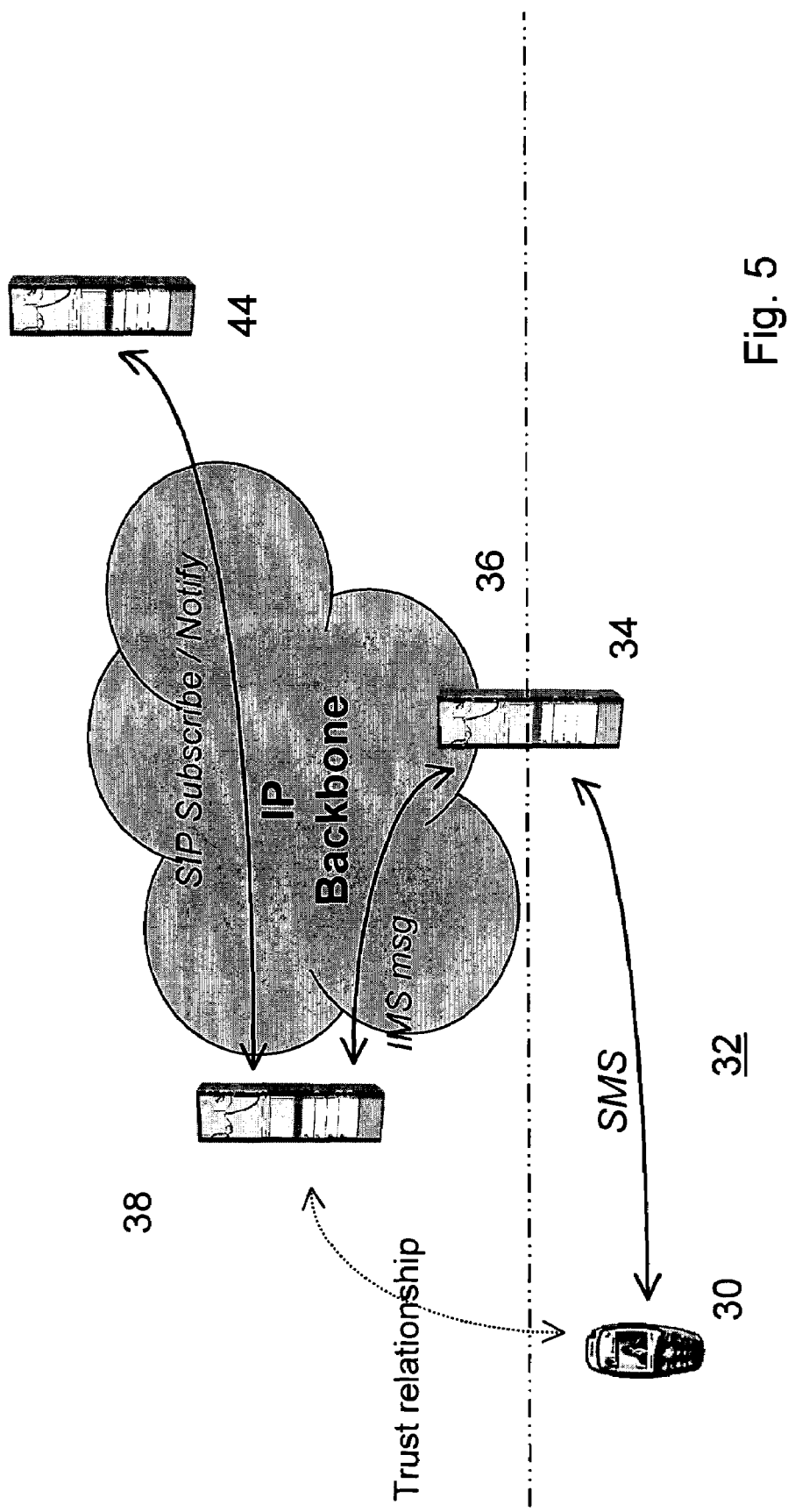

The SIP event subscriber proxy server entity 38 is preferably arranged to have a trusted relationship with the mobile user equipment 30. For example, security algorithms and coding/decoding arrangements may be used for this purpose. In cases where authentication is required, the authentication may be performed by the SIP event subscriber proxy server 38. This may be based on keys shared with the mobile user equipment. As shown by FIG. 5, the user equipment 30 may communicate information in this regard directly with the SIP event subscriber proxy 38.

The normal SMS security procedures including authentication and spoof proof may be used in the embodiments. However, for applications requiring improved security it is possible to create another layer of authentication on top of the existing authentication procedures.

It may be possible that the event subscriber proxy requires the user equipment to subscribe to the required service first. That is, some kind of subscriber and service provider relationship may be required before the user equipment is allowed to communicate with the proxy in this regard. This kind of pre-subscription can be done through means like a SMS message to a service centre, web signup and so on. The mobile user's phone number may be used to relate the a-priori subscription with the actual usage of the event subscriber proxy through the mobile user equipment.

The user may find it inconvenient to include address information such as the addresses for the SIP Subscriber proxy and SIP Event Server into a short message service (SMS) text message. The user may not even be aware of these addresses. Thus it may be advantageous to communicate information identifying these addresses or at least indicating where the addresses can be found to the user equipment. For example, if a User orders/activates a service using the World Wide Web (WWW) or the SMS, the required addresses of Subscriber Proxy and/or Event Server could be uploaded to the user equipment using the SMS during or right after the registration. As the delivery of address information as such is well known art, e.g. when activating GPRS or MMS settings first time, this further embodiments need no further explanations.

In FIGS. 1 and 3 the content is shown to be delivered by means of messages passing through two SIP proxies 40 and 42. It shall be appreciated that the local proxies are not always necessary. Such operation is illustrated in FIGS. 4 and 5.

It shall be appreciated that although FIGS. 1, 4 and 5 show only one mobile user equipment, a substantial number of mobile user equipment may be in simultaneous communication with the mobile communication network via a plurality of base stations thereof. It shall also be appreciated that the mobile user equipment may be referenced to by the term "mobile station". The user equipment may be any appropriate user equipment capable of enabling the user thereof to move around and sending and receiving information on a wireless interface.

It shall also be appreciated that several SIP event servers may exist. Thus the mobile user equipment 30 may subscribe to events that are hosted by different SIP event servers.

The embodiment of the present invention has been described in the context of an arrangement wherein the services are provided by means of a SIP based system and delivered to the user equipment by means of the SMS of the second generation GSM (Global System for Mobile communications) system. However, other messaging mechanisms such as multimedia messaging service (MMS) and Internet multimedia Subsystem of the third generation (3G) telecommunication standards may be used as well. As also shown in FIG. 5, message may be handled between the user equipment and the proxy by means of a plurality of different transportation mechanism. For example, messages between the SMS gateway 34 and SIP event subscriber proxy 38 may be based on the 3GPP IP Multimedia Subsystem (IMS) messaging. This part of the messaging can also be based on the Hypertext Transfer Protocol (HTTP). It shall thus be appreciated that the interface and the address format between the SMS gateway and the subscriber proxy do not need to be SIP based, or even standardized.

The response SMSs triggered by the SIP Notifies from the event server 44 may be delivered to the user equipment via a different SMS gateway than the one through which the user equipment sent the original subscription request. This might be advantageous in particular in occasions when the subscription is not a 'one-shot-subscription'. In such instance several individual responses may need to be delivered, and as the mobile user equipment may move in between, the gateway may have changed. However, since no subscription specific data is stored in the SMS gateway, this does not effect the operation of the present invention.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   generating at a mobile user equipment a service request in accordance with a first communication protocol, said service request containing information regarding a service a user of the mobile user equipment wishes to subscribe to;
   sending the service request from the mobile user equipment to a gateway entity via a first communication system;
   delivering from the gateway entity to a subscriber entity said information regarding the requested service via a second communication system, the gateway entity interfacing the first communication system and the second communication system;
   generating at the subscriber entity a service subscription message in accordance with a second communication protocol based on said information regarding the requested service;
   sending the service subscription message from the subscriber entity to a service provider entity providing the requested service via the second communication system; and
   sending data to the user equipment for the provisioning of the requested service,
   wherein the mobile user equipment is not enabled to utilize the second communication protocol for said service request.

2. The method as claimed in claim 1, wherein the first communication protocol enables the mobile user equipment to send and receive short text messages.

3. The method as claimed in claim 1, wherein the second communication protocol comprises session initiation protocol.

4. The method as claimed in claim 1, wherein the service provider entity provides a session initiation protocol event server.

5. The method as claimed in claim 1, wherein the service subscription message generated by the subscriber entity comprises a message for subscribing to an event provided by the service provider entity in accordance with a session initiation event protocol.

6. The method as claimed in claim 5, wherein the subscriber entity generates the service subscription message to include information regarding at least one of: a requested event package, a requested event, and event specific information.

7. The method as claimed in claim 1, further comprising:
   generating in response to the service subscription message from the service provider entity an information message in accordance with said second communication protocol containing information associated with the provisioning of the service;
   sending said information message to the subscriber entity;
   receiving the information at the subscriber entity; and
   generating at the subscriber entity a transportation message in accordance with the first communication protocol for transportation to the mobile user equipment.

8. The method as claimed in claim 7, further comprising:
   sending at least one further information message containing information associated with the provisioning of the service to the subscriber entity in response to a change in a status of a subscribed event.

9. The method as claimed in claim 7, further comprising:
   periodic sending of further information messages containing information associated with the provisioning of the service to the subscriber entity.

10. The method as claimed in claim 1, wherein the service request contains information regarding the user equipment, the service provider entity, the requested service, and the subscriber entity.

11. The method as claimed in claim 10, further comprising:
    obtaining information from the service request at the gateway entity and forwarding content to the subscriber entity based on said information obtained from the service request.

12. The method as claimed in claim 1, further comprising:
    storing at the subscriber entity information regarding the service request received from the mobile user equipment.

13. The method as claimed in claim 12, further comprising:
sending stored information messages to the mobile user equipment based on the stored information.

14. The method as claimed in claim 1, wherein the service subscriber entity is managed independently from an operator of the first communication system.

15. The method as claimed in claim 1, further comprising:
using at least three different messaging formats between the mobile user equipment and the service provider entity providing the requested service.

16. The method as claimed in claim 1, further comprising:
dividing a message to or from the mobile user equipment into at least two short text messages.

17. The method as claimed in claim 1, wherein the gateway entity and the subscriber entity are provided in separate network elements.

18. The method as claimed in claim 1, wherein the gateway and subscriber entities are provided in a network element.

19. The method as claimed in claim 1, further comprising:
using at least one security feature for communication between the mobile user equipment and the subscriber entity.

20. The method as claimed in claim 1, further comprising:
establishing a service subscriber relationship between the user equipment and the service provider entity before sending the service request from the mobile user equipment to the subscriber entity.

21. The method as claimed in claim 20, wherein the establishing the subscriber relationship further comprises delivering information regarding an address of the subscriber entity to the mobile user equipment.

22. The method as claimed in claim 20, wherein the establishing the subscriber relationship further comprises delivering information regarding an address of the service provider entity to the user equipment.

23. A communication system comprising:
a first communication network servicing a mobile user equipment in accordance with a first communication protocol, the mobile user equipment being configured to generate a service request in accordance with the first protocol containing information regarding a desired service;
a second communication network operating in accordance with a second communication protocol;
a gateway entity interfacing the first and second communication networks;
a subscriber entity connected to the second communication network for generating a service subscription message in accordance with the second communication protocol based on information from the service request sent from the gateway entity via the second communication network; and
at least one service provider entity for provision of the requested service in response to the service subscription message generated by the subscriber entity,
wherein the mobile user equipment is not enabled to utilize the second communication protocol for said service request.

24. The communication system of claim 23, wherein the user equipment is enabled to send and receive short text messages by means of the first communication protocol.

25. The communication system of claim 23, wherein the second communication protocol comprises a session initiation protocol.

26. The communication system of claim 23, wherein the service provider entity comprises a session initiation protocol event server.

27. The communication system of claim 23, wherein the subscriber entity is arranged to generate the service subscription message in accordance with the session initiation event protocol.

28. The communication system of claim 23, wherein the service provider entity is configured to respond the service subscription message by sending information associated with the provisioning of the service to the subscriber entity and the subscriber entity is configured to generate, based on said information associated with the provisioning of the service, a message to the mobile user equipment.

29. The communication system of claim 28, wherein the service provider entity is configured to respond the service subscription message by sending more than one message containing information associated with the provisioning of the service to the subscriber entity.

30. The communication system of claim 23, wherein the service subscriber entity is managed independently from an operator of the first communication system.

31. The communication system of claim 23, wherein the gateway entity and the subscriber entity are provided in separate network elements.

32. The communication system of claim 23, wherein the gateway entity and the subscriber entity are provided in a network element.

33. A service subscriber entity, comprising:
a processor configured to process service requests received from a mobile user equipment via, a first communication system, a gateway entity of a second communication system, and the second communication system based on messages generated in accordance with a first communication protocol,
wherein the processor is configured to obtain information regarding services a user of the mobile user equipment desires to subscribe to and for generating service subscription messages in accordance with a second communication protocol based on said information regarding the requested services,
wherein the service subscriber entity is configured to send said service subscription messages to a service provider entity, and
wherein the service subscriber entity is configured to receive service requests from the mobile user equipment when the mobile user equipment is not enabled to utilize the second communication protocol for said service requests.

34. The service subscriber entity of claim 33, further comprising:
a memory for storing information from the service requests.

35. The service subscriber entity of claim 33, wherein the processor is configured to generate the service subscription messages on behalf of the mobile user equipment in accordance with a session initiation event protocol.

36. A communication system comprising:
first generating means for generating at a mobile user equipment a service request in accordance with a first communication protocol, said service request containing information regarding a service a user wishes to subscribe to;
a first sending means for sending the service request from the mobile user equipment to a gateway entity via a first communication system;

delivering means for delivering from the gateway entity to a subscriber entity said information regarding the requested service via a second communication system, the gateway entity interfacing the first communication system and the second communication system;

second generating means for generating at the subscriber entity a service subscription message in accordance with a second communication protocol based on said information regarding the requested service;

a second means for sending the service subscription message from the subscriber entity to a service provider entity providing the requested service via the second communication system; and a third sending means for sending data to the user equipment for the provisioning of the requested service, wherein the mobile user equipment is not enabled to utilize the second communication protocol for said service request.

37. The communication system as claimed in claim 36, wherein the first communication protocol enables the mobile user equipment to send and receive short text messages.

38. The communication system as claimed in claim 36, wherein the second communication protocol comprises session initiation protocol.

39. The communication system as claimed in claim 36, wherein the service provider entity provides a session initiation protocol event server.

* * * * *